Patented Apr. 24, 1945

2,374,313

UNITED STATES PATENT OFFICE

2,374,313

TREATMENT OF HYDROCARBONS

Preston L. Veltman, Beacon, N. Y., assignor to The Texas Company, New York, N. Y., a corporation of Delaware No Drawing. Application January 8, 1942, Serial No. 426,053

4 Claims. (Cl. 196—52)

This invention relates to the catalytic treatment of hydrocarbons and particularly to the catalytic treatment of petroleum hydrocarbons. The invention especially relates to improved catalysts adapted for use in the molecular transformation of hydrocarbons and particularly in the conversion of petroleum hydrocarbons of relatively high molecular weight at elevated temperatures to form gasoline hydrocarbons of high octane number. The catalysts are also adapted for use in the reforming of naphtha, for example, straight-run or cracked naphtha, to produce gasoline hydrocarbons of improved octane number.

In the catalytic cracking of petroleum oils, ordinarily the oil to be cracked is heated and vaporized and the hot vapors are brought into contact with a solid catalyst under controlled conditions of temperature and pressure. Reaction products, including gas, gasoline hydrocarbons and higher boiling hydrocarbons are separated in conventional ways. During the conversion, coke-like material is deposited on the catalyst, reducing its activity and ability to catalyze the hydrocarbon conversion. It then becomes necessary to reactivate the catalyst, which may be accomplished by burning off the coke with a stream of air or other oxygen-containing gas. After thus reactivating the catalyst it may be reused in cracking additional quantities of oil.

One class of catalysts that has been found to be particularly valuable for use in the above outlined process consists of synthetic combinations of silica and alumina. Catalysts of this class may be prepared by co-precipitating hydrated silica and alumina gels and drying the resulting mixed gel. When the catalyst is to be used in the form of pieces, pellets or the like, it is usually the practice to dry the gel incompletely and then to mix an organic lubricant with the partially dried gel. The resulting mixture is then formed into the desired shapes and is calcined at an elevated temperature, for example, 900 to 1200° F. The mixed gels of the type referred to above may also be prepared by separately precipitating the silica gel and the alumina gel and then mixing the precipitates in wet condition, or by first preparing one of the gels and precipitating the other gel in the presence thereof. Catalysts of this class are more fully disclosed in United States Patent 2,229,353 to C. L. Thomas et al.

Other metallic oxides may be added to the silica-alumina catalysts. For example, valuable catalysts of this class which contain zirconia are disclosed in British Patent 534,121.

These catalysts are considered to comprise essentially a molecular admixture of silica and alumina, together with the other metal oxide, if used, and the components of the completed catalyst appear to be present in colloidal or amorphous, rather than crystalline form, although there is some evidence that a part at least of the alumina may be crystalline. While as described in the above patents, the proportions of silica and alumina and the other oxide, if used, may be varied, the preferred catalysts contain a major proportion of silica and a minor proportion of the other components.

Although the synthetic silica-alumina catalysts are desirable from most standpoints, they have the disadvantage of being relatively expensive. The present invention is concerned with catalysts prepared from hydrated silica and alumina gels but which are characterized by being relatively inexpensive.

It has been discovered in accordance with the invention that catalysts which are particularly valuable for use in the cracking or reforming of petroleum hydrocarbons can be prepared by dispersing an active synthetic combination of hydrated silica and alumina gels in a naturally-occurring clay composed substantially of an aluminum silicate and being relatively catalytically inactive.

The catalysts of the invention can be prepared by a number of methods which result in the dispersion of the active silica-alumina particles throughout the clay. In accordance with one manner of proceeding a silica-alumina catalyst prepared as outlined above, which preferably has been calcined, may be ground into a powder and then mixed with an aqueous slurry of the clay. The resulting mixture is then treated as described below to produce a finished catalyst. The catalyst may also be prepared by dispersing the clay in water and then adding to the clay dispersion a soluble silicate such as sodium silicate. The resulting mixture is then treated to precipitate a hydrated silica gel therein. This may be done by acidifying the mixture with an acid, such as hydrochloric acid, and then carefully neutralizing with an alkaline material, such as ammonium hydroxide. Thereafter, and preferably after partially drying the mixture, a solution of a soluble aluminum salt such as aluminum nitrate or chloride is added. A hydrated alumina gel is then precipitated in the presence of the mixture by adding an alkaline material in amount sufficient to substantially neutralize the aluminum salt.

In accordance with another method a mixed gel containing hydrated silica gel and hydrated alumina gel and, if desired, a gelatinous precipitate of another oxide, such as zirconia, is separately prepared, and then while still wet is mixed with the clay which may be dried or itself may be in the form of an aqueous slurry.

The mixed product obtained as a result of any of the foregoing procedures or similar procedures is then treated to produce a finished catalyst. This treatment consists broadly in partially drying the aqueous mixture and thereafter calcining the partially dried product at an elevated temperature which may be in the range from about 700 to 1200° F. Since the catalysts are particularly adapted for use in the form of pieces, pellets or the like, it is usually preferred to obtain the mixed product with a moisture content in the neighborhood of 20 per cent, for example, by partially drying a precipitate removed from an aqueous slurry by filtering, at a temperature of about 200 to 300° F. With a moisture content of this order the catalyst mass is in a plastic condition, aided by the plasticity of the clay, and is adapted for the efficient production of pellets and the like. After being pelleted, the catalysts are then calcined as above described to prepare them for immediate use in the catalytic reaction. The finished catalysts are physically sturdy and may be handled and used for long periods of time without breaking down.

It has been found that although the clays are substantially inactive as cracking catalysts, the composite catalysts of this invention produce good yields of gasoline when employed as catalysts in the usual way. For example, the activity of the catalysts is greater than would be expected from the activity of the individual components. While the invention is not limited to any theory of operation, there is reason to believe that the catalysts are composed of isolated active particles dispersed in a porous, refractory support, and that these particles exhibit maximum activity because the carbon deposited during reaction coats the particles of the support and the active particles remain more free from this coating. When a catalyst is composed substantially entirely of active particles, it appears that the activity of a material proportion of these particles is soon reduced due to carbon deposition.

The clays that are adapted for use in preparing the catalyst comprise a variety of kaolinite and montmorillonite clays. They are characterized in that they are substantially inactive as catalysts when used alone and they are substantially free from alkali metals. The clays are substantially unchanged upon being heated up to about 1500° F., which is above the highest temperature to which they are likely to be subjected in preparation of the catalysts or in use. These clays are crystalline aluminum silicates containing varying proportions of alumina and silica; kaolinite, for example, has the ideal formula $(OH)_8Al_4Si_4O_{10}$, and montmorillonite has the ideal formula $(OH)_4Al_4Si_8O_{20}.xH_2O$. The clays are also characterized in that they swell but slightly, if at all, on contact with water. Ball clays, which may contain substantial proportions of either kaolinite or montmorillonite, are examples of clays adapted for use. Other clays which have been found to be valuable are clays which are largely composed of montmorillonite and have been used in the past, usually after acid treatment, as decolorizing agents for lubricating oil fractions of petroleum. The clays may be used as such or after acid-treatment, the untreated clays being satisfactory when they are sufficiently free from alkali metals to avoid fusion at conversion temperatures. Clays of the class defined are readily available at relatively low cost and hence the catalysts of the invention may be prepared economically.

In making up the catalysts, the clays will preferably be used in amounts sufficient to constitute at least 40 per cent, and may constitute as high as about 80 per cent of the catalysts by weight.

In order that the invention may be understood more fully, reference should be had to the following examples, in which are described methods of preparing certain of the catalysts.

Example I

The clay employed in preparing the catalyst of this example was a raw, gray, earthy Texas clay which is known as Lena clay. This clay contains montmorillonite and is sometimes termed a subbentonite but is distinguished from true bentonites in that it contains only a very small amount of alkali metals and does not swell noticeably on contact with water. After acid treatment, the clay is adapted for use as a decolorizing agent for lubricating oils. 500 grams of this clay of 40 mesh size were dispersed in five liters of water. 268 grams of a solution of sodium silicate (containing about 28 per cent $SiO_2$ by weight) was dissolved in one liter of water and added to the dispersion while stirring rapidly. The system was then neutralized to phenolphthalein with hydrochloric acid and after stirring was made faintly acid to Congo red. The gelatinous product was then placed on a steam bath and heated at about 160° F. for four hours. Ammonium hydroxide was then added to make the system just acid to litmus.

The solid material present in the slurry, which included hydrated silica gel, was removed by filtration and washed three times by slurrying with 1.5 liters of water. To remove sodium, the gelatinous mass was washed once with a solution containing 31 grams of $Al(NO_3)_3.9H_2O$ in two liters of water and was then dried at 250° F. for 6½ hours. This resulted in a partially dried product. The partially dried product was added to a solution of 82 grams of $Al(NO_3)_3.9H_2O$ in five liters of water and stirred for twenty minutes. Ammonium hydroxide solution was then run in to make the slurry just acid to litmus. As a result of this procedure hydrated alumina gel was precipitated in the slurry. The precipitate was removed by filtration, washed five times by slurrying and dried for 18 hours at 250° F. It was then ground to 10 mesh, washed substantially free of sodium, and dried for 8 hours at 250° F. The relatively dry product, which, however, contained some moisture, was ground to 40 mesh and pelleted. The pellets were then calcined at 1000° F.

Example 2

500 grams of the clay employed in Example I were ground to 20 mesh and slurried with five liters of water. The dispersion of the clay was increased by adding five grams of tannic acid and three grams of sodium hydroxide, followed by stirring. The mixture was then made acid to Congo red by the addition of hydrochloric acid. 268 grams of a solution of sodium silicate (containing about 28 per cent $SiO_2$ by weight) dissolved in two liters of water was poured in and the mixing continued for twenty minutes. Hydrochloric acid was then introduced in amount sufficient to make the system acid again to Congo red. The resulting slurry was heated to 120° F. for twelve hours and at 180° F. for three hours.

Following the heating, ammonium hydroxide was added in amount sufficient to make the slurry neutral to litmus. Thereafter the precipitate was removed by filtration and washed three times with very dilute hydrochloric acid. To reduce the alkali metal content of the mixture, it was washed once with a solution containing 10 grams of $AlCl_3.6H_2O$ in one liter of water. The precipitate was then slurried in a solution containing 55.5 grams of $AlCl_3.6H_2O$ and five liters of water. After stirring twenty minutes, ammonium hydroxide was added to make the system neutral to litmus. The precipitate was then removed from the neutral solution by filtration, washed three times with water, and dried at 200° F. for 15 hours. The product was then washed in six one-liter portions of water to remove sodium. Thereafter it was dried at 200° F. for 18 hours, passed through a 20 mesh screen, and pelleted with four per cent flour and two per cent stearic acid. The pellets were calcined at 1000° F.

*Example 3*

In preparing the catalyst of this example a clay which is sold for use as a ball clay, under the trade name "White Ivory Fat," was used. X-ray analysis indicated that this clay contained montmorillonite and alpha quartz. 250 grams of the clay of 40 mesh size were slurried in four liters of water. To this slurry there was added with rapid stirring a solution of 392 grams of sodium silicate dissolved in two liters of water. The resulting slurry was then treated carefully with hydrochloric acid until neutral to phenolphthalein. Thereafter the slurry was made distinctly acid to Congo red by the addition of dilute hydrochloric acid. Dilute ammonium hydroxide was then added until the system was just basic to litmus. The precipitate formed was filtered off and washed three times by slurrying with water, and once using a very dilute solution of hydrochloric acid.

A solution containing 637 grams of

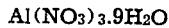

$Al(NO_3)_3.9H_2O$ in five liters of water was prepared and the mixture of clay and hydrated silica gel prepared as above described was added thereto. Dilute ammonium hydroxide was then added slowly to the resulting mixed slurry to make it just acid to litmus, after which the system was filtered and the precipitate was washed three times with water. The mass was also washed once by slurrying in three liters of water to which 30 grams of ammonium chloride had been added. The mass was then dried at 250° F. for 24 hours, after which it was washed three times with water. It was then dried at 250° F. to reduce the moisture content to about 20 per cent, passed through a 20 mesh sieve, mixed with four per cent flour and two per cent stearic acid, pelleted and calcined at 1000° F.

The catalysts described in the examples were employed as cracking catalysts in the cracking of virgin gas oil, having an end boiling point of 700° F., and derived as a distillate from East Texas crude. The vaporized gas oil, heated to about 1000° F., was charged continuously to a tower packed with the catalyst in the form of pellets at a space velocity of about 2.2 (400 cc. of gas oil per hour per 180 cc. of catalyst). The tower was maintained at a temperature of 1000° F. and under atmospheric pressure.

Under these conditions over a two-hour processing period a catalyst consisting of the clay employed in making up the products of Examples 1 and 2 gave a yield of 400° F. end point gasoline of 10.4 per cent by volume, basis charge, and the gasoline had an octane number (L-3) of 76.5. As contrasted with this, the catalyst of Example 1, gave a gasoline yield of 20.5 per cent with an octane number (L-3) of 83.1, and the catalyst of Example 2, gave a gasoline yield of 22.7 per cent with an octane number (L-3) of 82.3. Under similar conditions a catalyst prepared by combining hydrated silica and hydrated alumina gels gives a gasoline yield of about 25 per cent. It will be noted that the materials employed in Examples 1 and 2 are used in such proportions as to produce a product containing about .77 per cent of the clay, 21 per cent added silica, and 2 per cent added alumina. Based on the relative proportions of clay and the silica-alumina present in the catalysts of Examples 1 and 2 it will be seen that the expected yield would be about 13.8 per cent. Thus the yield obtained was considerably higher than the additive effect of the components would suggest.

Under similar conditions the ball clay used in Example 3 gave a gasoline yield of 13 per cent over a four-hour processing period. As contrasted with this, the catalyst of Example 3 gave a gasoline yield of 20.9 per cent.

The foregoing catalytic cracking runs provide a further identification of the type of clay contemplated for use in the present invention. Under the conditions specified, the clays when used alone give a gasoline yield of substantially less than 15 per cent.

It will be understood that the examples are merely illustrative of the invention and that other catalysts may be prepared by using other clays of the class herein defined in combination with active combined silica and alumina gels.

As indicated above, the ratio of silica to alumina, or to alumina and another metal oxide such as zirconia, is preferably such that the silica constitutes a major proportion of the combination. In general, it may be stated that in the more valuable catalysts the silica constitutes at least 70 per cent of the combination and may constitute up to 99 per cent, although about 94 per cent is the preferred upper limit.

In preparing catalysts containing another metal oxide such as zirconia in combination with the alumina and silica, the metal oxide may be introduced in the various ways previously described. For example, the examples may be changed by adding to the mixture with the aluminum salt a salt of zirconium such as zirconium oxychloride. The later treatment with the ammonium hydroxide is effective to precipitate zirconia as well as alumina. In these cases, the zirconia may be incorporated in the mixture in about the same proportions as the alumina.

While a cracking temperature of 1000° F. has been specifically referred to, it will be understood that other temperatures may be used, for example, from about 700° to 1100° F. Generally, temperatures from 900 to 1000° F. are preferred. Also, the space velocity may vary from that mentioned, and may range from about 1 to 10. The pressure used may be varied as desired and may be around atmospheric to 100 to 300 pounds per square inch, for example.

In the foregoing description the preparation of the catalyst in the form of pieces or pellets has been particularly described but the catalyst may also be used in the powder form. Also, while vapor phase reactions have been described the catalysts of the invention may be also be employed in liquid phase cracking.

Obviously many modifications and variations of the invention, as hereinabove set forth, may be made without departing from the spirit and scope thereof, and therefore only such limitations should be imposed as are indicated in the appended claims.

I claim:

1. The process of converting hydrocarbon oils to gasoline hydrocarbons of high anti-knock value which comprises contacting said oils at conversion temperatures with a solid catalyst comprising a dried amorphous combination of hydrated silica gel, hydrated alumina gel, and a naturally-occurring, substantially catalytically inactive montmorillonite clay, said catalyst containing at least 40 per cent by weight of said clay.

2. The process of converting hydrocarbon oils to gasoline hydrocarbons of high anti-knock value which comprises contacting said oils at conversion temperatures with a solid catalyst comprising a dried amorphous combination of hydrated silica gel, hydrated alumina gel, and a naturally-occurring, substantially catalytically inactive sub-bentonite clay containing montmorillonite, said clay being adapted to be converted to an active decolorizing agent for lubricating oil upon acid treatment, said catalyst being prepared by a process comprising the step of forming a mixture containing said clay in the raw state, and treating said mixture with acid, said catalyst containing at least 40 per cent by weight of said clay.

3. The process of cracking high molecular weight hydrocarbons to produce lower molecular weight hydrocarbons which comprises contacting said high molecular weight hydrocarbons at cracking temperatures with a solid catalyst comprising a dried amorphous combination of hydrated silica gel, hydrated alumina gel, and a naturally-occurring, substantially catalytically inactive sub-bentonite clay containing montmorillonite, said clay being adapted to be converted to an active decolorizing agent for lubricating oil upon acid treatment, said catalyst being prepared by a process comprising the steps of forming an aqueous mixture containing said clay in the raw state and an alkali metal silicate, and treating said mixture with acid to precipitate silica gel in the presence of said clay, said catalyst containing at least 40 per cent by weight of said clay.

4. The process of converting hydrocarbon oils to gasoline hydrocarbons of high anti-knock value which comprises contacting said oils at conversion temperatures with a solid catalyst comprising a dried amorphous combination of hydrated silica gel, hydrated alumina gel, and a naturally-occurring, substantially catalytically inactive sub-bentonite clay containing montmorillonite, said clay being adapted to be converted to an active decolorizing agent for lubricating oil upon acid treatment, said catalyst being prepared by a process comprising the steps of forming an aqueous mixture containing said clay in the raw state and sodium silicate, and treating said mixture with acid to precipitate silica gel in the presence of said clay, said catalyst containing about 40 to 80 per cent by weight of said clay.

PRESTON L. VELTMAN.